US007368028B2

(12) United States Patent
Spatafora

(10) Patent No.: US 7,368,028 B2
(45) Date of Patent: May 6, 2008

(54) METHOD AND UNIT FOR APPLYING LABELS TO PRODUCTS AND COLLECTING REJECT LABELS

(75) Inventor: Mario Spatafora, Granarola (IT)

(73) Assignee: G.D Societa' per Azioni, Bologna (IT)

( * ) Notice: Subject to any disclaimer, the term of this patent is extended or adjusted under 35 U.S.C. 154(b) by 0 days.

(21) Appl. No.: 11/401,216

(22) Filed: Apr. 11, 2006

(65) Prior Publication Data

US 2006/0260756 A1 Nov. 23, 2006

(30) Foreign Application Priority Data

Apr. 12, 2005 (IT) .......................... BO2005A0225

(51) Int. Cl.

| | |
|---|---|
| ***B44C 1/17*** | (2006.01) |
| ***B44C 1/24*** | (2006.01) |
| ***B29C 65/50*** | (2006.01) |
| ***B29C 65/56*** | (2006.01) |
| ***B32B 37/10*** | (2006.01) |
| ***B32B 37/16*** | (2006.01) |
| *B29C 65/54* | (2006.01) |
| *B29C 65/78* | (2006.01) |
| *B29C 63/04* | (2006.01) |
| *B32B 37/02* | (2006.01) |

(52) U.S. Cl. ...................... 156/235; 156/230; 156/241; 156/362; 156/378; 156/475

(58) Field of Classification Search ................ 156/230, 156/247, 249, 256, 257, 350, 363, 368, 378, 156/235, 241, 297, 361, 362, 443, 446, 475, 156/538–539, 556, 580, 581, 582, DIG. 31

See application file for complete search history.

(56) References Cited

U.S. PATENT DOCUMENTS

| | | | | |
|---|---|---|---|---|
| 4,876,839 | A * | 10/1989 | Honda et al. | 53/136.3 |
| 5,309,695 | A | 5/1994 | Frabetti et al. | |
| 6,477,822 | B1 * | 11/2002 | Spatafora et al. | 53/461 |
| 6,763,870 | B2 * | 7/2004 | Spatafora et al. | 156/483 |
| 7,192,502 | B2 * | 3/2007 | Spatafora et al. | 156/249 |
| 2005/0167024 | A1 * | 8/2005 | Sanzone et al. | 156/64 |
| 2006/0249240 | A1 * | 11/2006 | Dijkstra | 156/64 |

FOREIGN PATENT DOCUMENTS

| | | | |
|---|---|---|---|
| EP | 1 502 861 | A1 | 7/2004 |
| GB | 2 390 594 | A | 1/2004 |

* cited by examiner

*Primary Examiner*—Philip C. Tucker
*Assistant Examiner*—Sonya Mazumdar
(74) *Attorney, Agent, or Firm*—Birch, Stewart, Kolasch & Birch, LLP

(57) ABSTRACT

A method and unit for applying labels to products fed by a conveyor along a conveying path; a number of pickup heads are fed along a feed path to withdraw the labels successively from a feeder and apply the labels successively to respective products on the conveyor; and, in the event of stoppage or malfunctioning, the pickup heads are fed along a reject path, adjacent to the feed path, to transfer at least some of the labels on the pickup heads to a collecting device.

12 Claims, 3 Drawing Sheets

METHOD AND UNIT FOR APPLYING LABELS TO PRODUCTS AND COLLECTING REJECT LABELS

The present invention relates to a method and unit for applying labels to products.

The present invention may be used to advantage for applying revenue labels to packets of cigarettes, to which the following description refers purely by way of example.

BACKGROUND OF THE INVENTION

Known methods of applying revenue labels to packets of cigarettes comprise feeding the packets of cigarettes along a conveying path and through a labelling station; withdrawing a revenue label from a store by means of a pickup head; feeding the pickup head along a feed path through the labelling station; and applying the revenue label to a respective packet of cigarettes at the labelling station. Along the feed path and between the store and the labelling station, there are normally provided a cutting station, where each revenue label is cut to form a tear line, and a gumming station, where an inner surface of each label is coated with glue.

One example of a unit of the above type for applying revenue labels to packets of cigarettes is described in Patent Application EP 1502861 A1.

In known units of the above type for applying revenue labels to packets of cigarettes, when the unit is stopped on account of stoppage of the packing machine of which the unit forms part, the revenue labels on the pickup heads, i.e. the revenue labels withdrawn from the store but not yet applied to the packets of cigarettes, must be rejected. In particular, it is essential that the gummed revenue labels not yet applied to the packets be rejected, on account of the glue inevitably drying while the machine is idle, and so making the revenue labels unusable. It is also advisable to reject the revenue labels withdrawn from the store and not yet gummed, on account of the unit being easier to restart from a standard completely empty condition. In this connection, it should be pointed out that, though the revenue labels withdrawn from the store and not yet cut or gummed may theoretically be fed back into the store, this must be done manually, is a long, complex job, and is therefore economically unfeasible for the sake of salvaging one or two revenue labels.

In known units of the above type for applying revenue labels to packets of cigarettes, whenever the unit is stopped on account of stoppage of the packing machine of which the unit forms part, the revenue labels withdrawn from the store and not yet applied to the packets of cigarettes must be rejected manually by the operator opening the casings on the packing machine and manually removing the revenue labels from the pickup heads. Moreover, given their revenue value, the reject revenue labels cannot be disposed of, but must be applied to a cancellation ledger. Manually rejecting the revenue labels withdrawn from the store and not yet applied to the packets of cigarettes is therefore a relatively time-consuming job which, given the revenue value of the labels, must be performed by a trained, trusted operator.

SUMMARY OF THE INVENTION

It is an object of the present invention to provide a method and unit for applying labels to products, which method and unit are designed to eliminate the aforementioned drawbacks, while at the same time being cheap and easy to implement.

According to the present invention, there are provided a method and unit for applying labels to products, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
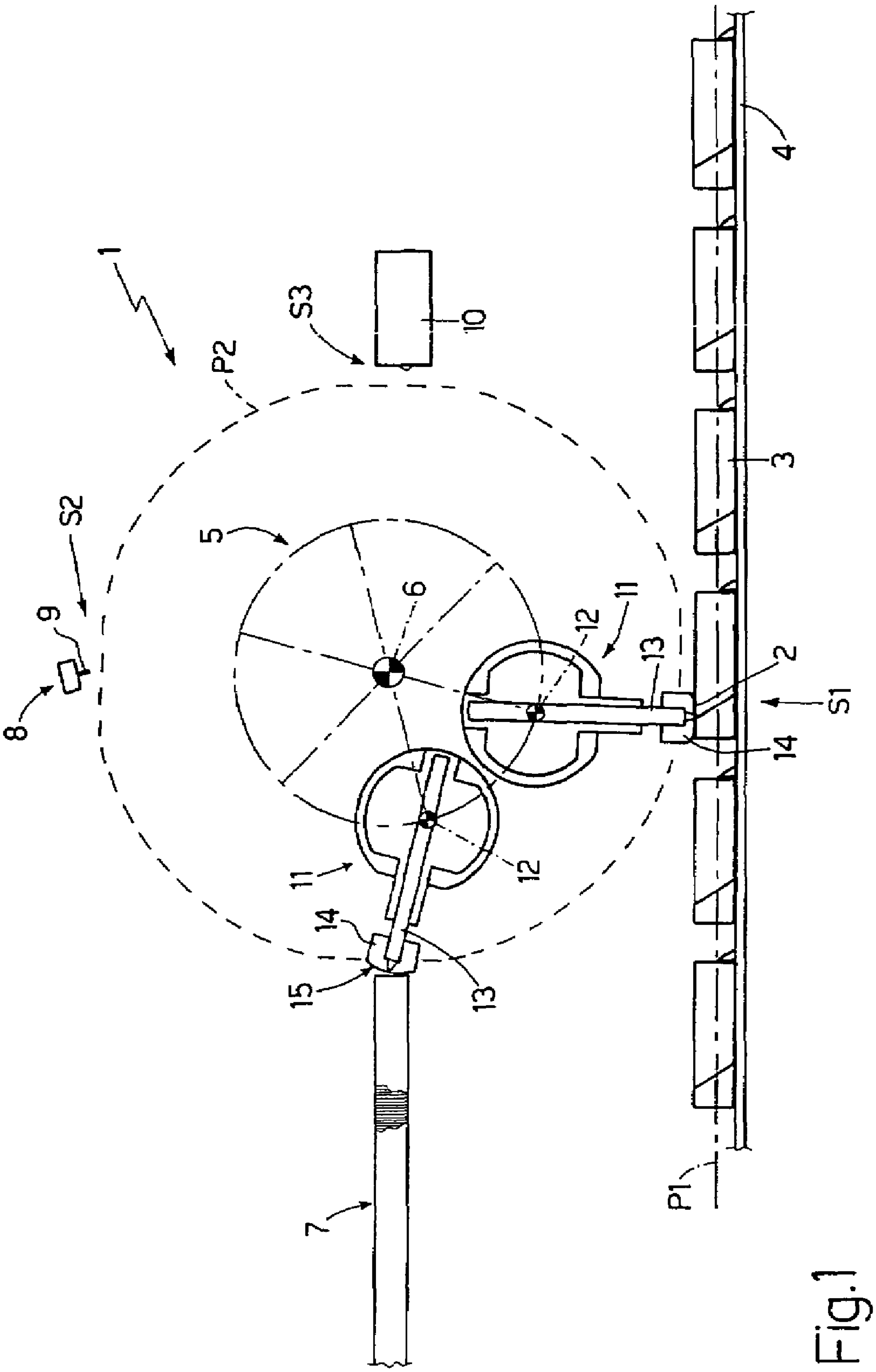
FIG. 1 shows a schematic front view, with parts removed for clarity, of a labelling unit in accordance with the present invention and in a feed configuration.

Number 1 in FIG. 1 indicates as a whole a unit for applying revenue labels 2 to packets 3 of cigarettes fed continuously by a conveyor 4 along a horizontal conveying path P1 and through a labelling station S1, where, in use, revenue labels 2 are applied to packets 3 of cigarettes.

Unit 1 for applying revenue labels 2 also comprises a feed wheel 5, which rotates continuously about a respective central axis 6, perpendicular to the FIG. 1 plane, to feed each revenue label 2 along a substantially circular feed path P2 extending from a label feeder 7 to labelling station S1 via a cutting station S2 and a gumming station S3.

Cutting station S2 has a cutting member 8 having a fixed blade 9 for cutting a tear line (not shown) on each revenue label 2. And gumming station S3 has a gumming device 10 for gumming an unprinted inner surface of revenue label 2, and having a spray nozzle or a coating device with a volumetric pump.

In the FIG. 1 embodiment, feeder 7 contains a horizontal stack of revenue labels 2, which are pushed to an outlet of the feeder by a known pusher (not shown). In an alternative embodiment not shown, feeder 7 contains a vertical or substantially vertical stack of revenue labels 2, which are fed by force of gravity to the feeder outlet. In a further embodiment not shown, feeder 7 comprises a cutting device for cutting revenue labels 2 off a continuous strip unwound off a reel.

Feed wheel 5 comprises six pickup assembles 11 (only two shown in FIG. 1 for the sake of clarity), each mounted on feed wheel 5 to rotate about a respective axis of rotation 12 parallel to the axis of rotation 6 of feed wheel 5. Each pickup assembly 11 comprises a sliding arm 13 movable lengthwise in a radial direction with respect to axis of rotation 12; and a respective pickup head 14, which is fitted to the opposite end of arm 13 to axis of rotation 12, and feeds a respective revenue label 2 along feed path P2.

Each pickup head 14 has a grip wall 15, which is slightly convex outwards and has a number of holes (not shown) connectable to a vacuum source (not shown) to retain a revenue label 2 by suction.

Feed wheel 5 comprises a cam mechanism (not shown) for activating each pickup assembly 11 so that each pickup assembly 11 rotates about respective axis of rotation 12, and each arm 13 slides radially with respect to relative axis of rotation 12.

Operation of unit 1 to apply revenue labels 2 to packets 3 of cigarettes will now be described, for the sake of simplicity, with reference to one pickup head 14, and as of the instant in which pickup head 14 is located immediately upstream from feeder 7.

When pickup head 14 is located immediately upstream from feeder 7, grip wall 15 is brought into contact with and rolled over the outlet of feeder 7. The rolling movement is achieved by rotating pickup head 14 simultaneously about axes of rotation 6 and 12, and moving arm 13 radially with respect to axis of rotation 12. As grip wall 15 rolls over the outlet of feeder 7, suction through grip wall 15 is activated so that revenue label 2 is withdrawn and retained by grip wall 15.

At this point, pickup head 14 is fed through cutting station S2, by rotating about axes of rotation 6 and 12, but with no radial movement with respect to axis of rotation 12. At cutting station S2, blade 9 forms the tear line (not shown) on revenue label 2; and, downstream from cutting station S2, pickup head 14 is fed along a substantially straight portion of feed path P2 through gumming station S3, by rotating pickup head 14 simultaneously about axes of rotation 6 and 12, and moving arm 13 radially with respect to axis of rotation 12.

Finally, pickup head 14 is fed through labelling station S1, where grip wall 15 rolls on a rear face of packet 3 to apply revenue label 2 to the rear face. At labelling station S1, pickup head 14 is fed along a substantially straight portion of feed path P2; and the rolling movement on the rear face of packet 3 is achieved by simultaneously rotating pickup head 14 about axes of rotation 6 and 12, and moving pickup head 14 radially with respect to axis of rotation 12. As it rolls on the rear face of packet 3, suction through grip wall 15 is cut off to apply revenue label 2 correctly to the rear face of the packet.

Figure 2:
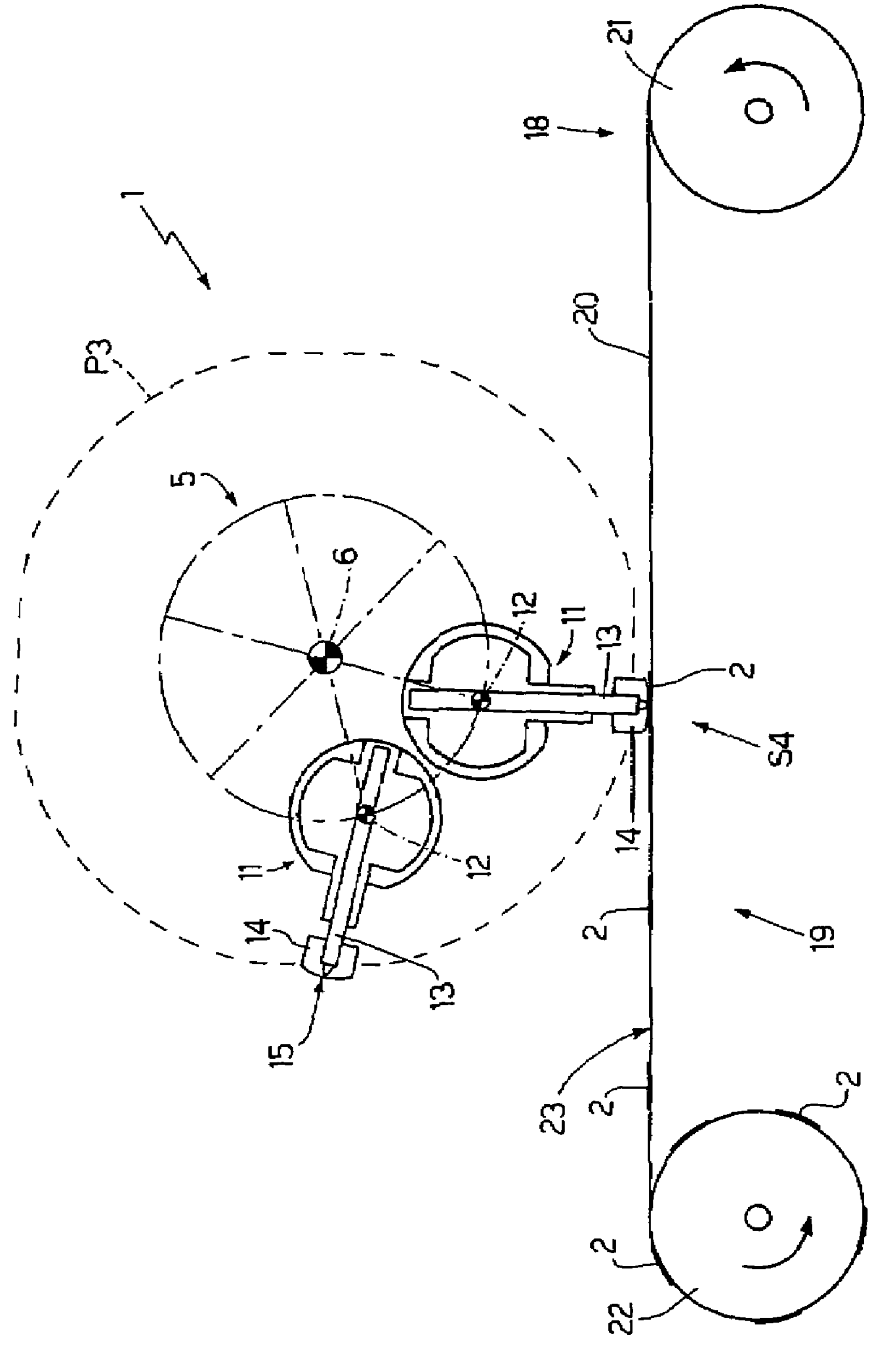
FIG. 2 shows a schematic front view, with parts removed for clarity, of the FIG. 1 unit in a reject configuration.
Figure 3:
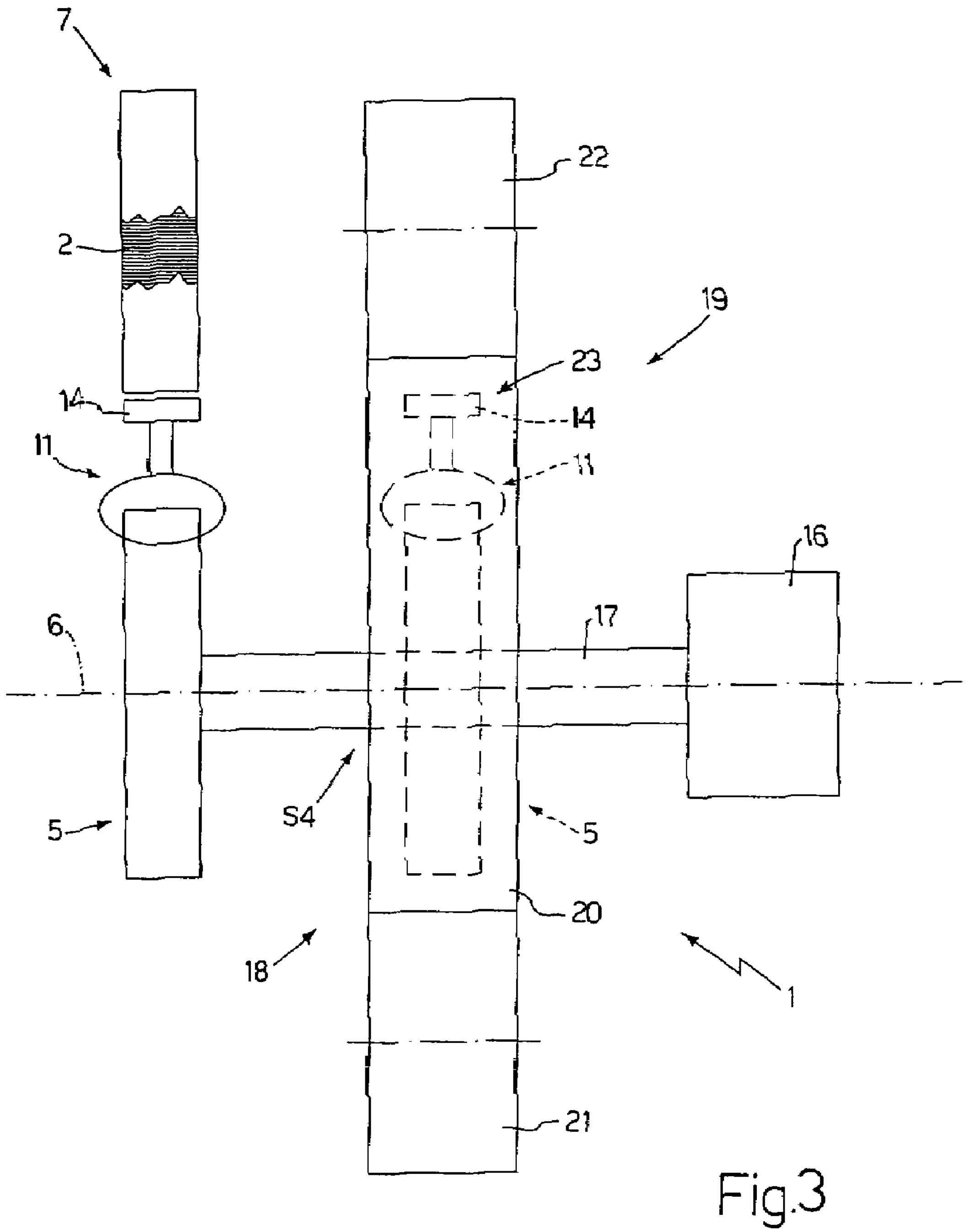
FIG. 3 shows a schematic plan view, with parts removed for clarity, of the FIG. 1 unit.

As shown in FIG. 3, unit 1 for applying revenue labels 2 comprises an actuating device 16 supporting a shaft 17 of feed wheel 5, and which permits rotation of shaft 17 about axis of rotation 6. Actuating device 16 also moves shaft 17 of feed wheel 5 along axis of rotation 6 to move feed wheel 5 between a feed position (FIG. 1) in which revenue labels 2 on pickup heads 14 are applied to packets 3 of cigarettes, and a reject position (FIG. 2) in which revenue labels 2 on pickup heads 14 are transferred to a collecting device 18.

As shown in FIG. 2, when feed wheel 5 is in the reject position, pickup heads 14 are fed along a reject path P3, which is the same substantially circular shape as feed path P2, and is coaxial with feed path P2. In other words, reject path P3 is parallel and adjacent to feed path P2.

A reject station S4 is located along reject path P3, comprises collecting device 18, and is parallel and adjacent to labelling station S1. Reject station S4 is designed and located to reproduce the form and location of labelling station S1, so that each pickup head 14 performs substantially the same identical movements along reject path P3 and feed path P2. In other words, if reject path P3 is identical to feed path P2, and reject station S4 is designed and located to reproduce the form and location of labelling station S1, then each pickup head 14 can perform exactly the same movements to feed a revenue label 2 onto a packet 3 of cigarettes at labelling station S1, and to transfer a revenue label 2 to collecting device 18 at reject station S4.

As shown in FIG. 2 collecting device 18 comprises a collecting conveyor 19, to which revenue labels 2 are transferred from pickup heads 14, and which supports a belt 20 wound into a reel 21 upstream from reject station S4, and into a reel 22 downstream from reject station S4. Belt 20 is unwound off reel 21, is fed through reject station S4 to receive revenue labels 2 successively from pickup heads 14, and is rewound into reel 22. Belt 20 is preferably adhesive to retain revenue labels 2 by adhesion. That is, a surface 23 of the belt facing pickup heads 14 is coated with adhesive to retain revenue labels 2 by adhesion. When reel 21 runs out, the used-up reel 21 is replaced with a new reel 21, and the full reel 22 is simultaneously replaced with an empty reel 22.

In an alternative embodiment not shown, collecting device 18 comprises a container into which revenue labels 2 are released by pickup heads 14.

During normal operation of unit 1, feed wheel 5 is set to the feed position (FIG. 1) in which the revenue labels 2 on pickup heads 14 are applied to packets 3 of cigarettes. In the event of stoppage or malfunctioning of unit 1, feed wheel 5 is automatically moved rapidly by actuating device 16 into the reject position (FIG. 2) in which the revenue labels 2 on pickup heads 14 are transferred to collecting device 18.

When feed wheel 5 is in the reject position (FIG. 2), pickup heads 14 are fed along reject path P3 adjacent to feed path P2 to transfer at least some (normally all) of the revenue labels 2 on pickup heads 14 to collecting device 18. Whenever unit 1 is stopped as a result of stoppage of the packing machine of which unit 1 forms part, the revenue labels 2 withdrawn from feeder 7 and not yet applied to packets 3 of cigarettes are thus rejected automatically by being transferred to collecting device 18.

Once all the revenue labels 2 have been transferred to collecting device 18, actuating device 16 moves feed wheel 5 into the feed position (FIG. 1), and unit 1 can be restarted rapidly.

Unit 1 for applying revenue labels 2 as described above has numerous advantages, by permitting, in the event of stoppage, rapid, automatic rejection of the revenue labels 2 withdrawn from feeder 7 and not yet applied to packets 3 of cigarettes. Moreover, unit 1 for applying revenue labels 2 as described above is cheap and easy to implement, by requiring only minor alterations with respect to a similar known unit, on account of reject path P3 being parallel and adjacent to feed path P2, and reject station S4 being designed and located to reproduce the form and location of labelling station S1.

In view of its many advantages, unit 1 for applying revenue labels 2 as described above may be used for applying any type of label to any type of product, when, in the event of stoppage, automatic rejection is required of the labels already withdrawn from a feeder. For example, unit 1 for applying labels as described above may be used for applying labels to food products, toiletries or detergents, bottles, and packages for confectionary or consumer goods.

The invention claimed is:

1. A method of applying labels to products fed by a first conveyor along a conveying path which comprises:

feeding a number of pickup heads along a feed path to withdraw the labels successively from a feeder and applying the labels successively to respective products disposed on the first conveyor, determining a stoppage or malfunctioning, moving, after a stoppage or malfunction the pickup heads along a reject path which is different from the feed path, and transferring at least some of the labels on the pickup heads to a collecting device arranged along the reject path, wherein the reject path has the same configuration as the feed path and the reject path is parallel to and adjacent to the feed path.

2. The method as claimed in claim 1, wherein the feed path and the reject path are substantially circular, and are coaxial with respect to each other.

3. The method as claimed in claim 1, wherein the feed path comprises a labelling station where the labels are applied to the products; and the reject path comprises a reject station where the labels are transferred to the collecting station; and the reject station is configured and positioned to correspond to that of the labelling station (S1).

4. The method as claimed in claim 1, wherein the pickup heads are fed cyclically by a second conveyor along both the feed path and the reject path; and the second conveyor is adapted to be moved from a feed position to a reject position, and vice versa, to move the pickup heads from the feed path to the reject path, and vice versa.

5. The method as claimed in claim 4, wherein each pickup head performs the same identical movements along both the reject path and the feed path.

6. The method as claimed in claim 5, wherein the second conveyor is a drum adapted to rotate about a respective central first axis of rotation; and each pickup head is hinged to the drum to rotate, with respect to the drum, about a second axis of rotation which is parallel to the first axis of rotation.

7. The method as claimed in claim 1, wherein the collecting device comprises a container, into which the labels are released by the pickup heads.

8. The method as claimed in claim 1, wherein each pickup head comprises a grip wall having suction means for holding the label on the grip wall.

9. The method as claimed in claim 8, wherein the grip wall is substantially outwardly convex.

10. The method as claimed in claim 9, wherein each pickup head is conveyed along the feed path by rotating the pickup head about a first and second axis of rotation parallel to each other, and by moving the pickup head radially with respect to the second axis of rotation; each grip wall performs a rolling movement on an outlet of the feeder to secure the label to the grip wall; the rolling movement of the grip wall on the outlet is achieved by rotating the pickup head simultaneously about said first and second axis of rotation, and moving the pickup head radially with respect to the second axis of rotation; each grip wall performing a rolling movement on a face of a product to apply the label to said face; and the rolling movement of the grip wall on the face is achieved by rotating the pickup head simultaneously about said first and second axis of rotation, and moving the pickup head radially with respect to the second axis of rotation.

11. A method of applying labels to products fed by a first conveyor along a conveying path which comprises:

feeding a number of pickup heads along a feed path to withdraw the labels successively from a feeder and applying the labels successively to respective products disposed on the first conveyor, determining a stoppage or malfunctioning, moving, after a stoppage or malfunction the pickup heads along a reject path which is different from the feed, path, and transferring at least some of the labels on the pickup heads to a collecting device arranged along the reject path, wherein the collecting device comprises a third collecting conveyor to which the labels are transferred by the pickup heads, said collecting conveyor comprising an adhesive belt wound into a first reel upstream from the reject station and into a second reel downstream from the reject station; and the adhesive belt is unwound from the first reel and is fed through the reject station to receive the labels successively from the pickup heads and is rewound into the second reel.

12. The method as claimed in claim 11, wherein, when the first reel runs out, the used-up first reel is replaced with a new first reel, and the full second reel is simultaneously replaced with an empty second reel.

* * * * *

UNITED STATES PATENT AND TRADEMARK OFFICE

CERTIFICATE OF CORRECTION

PATENT NO. : 7,368,028 B2
APPLICATION NO. : 11/401216
DATED : May 6, 2008
INVENTOR(S) : Mario Spatafora It is certified that error appears in the above-identified patent and that said Letters Patent is hereby corrected as shown below:

On the Title Page, please change the Inventor's town of residence from Granarola to --Granarolo-- as indicated below:

Item (75) should read --(75) Inventor: Mario Spatafora, Granarolo (IT)--.

Signed and Sealed this

Sixth Day of January, 2009

JON W. DUDAS
*Director of the United States Patent and Trademark Office*